S. CARNES.
Plow-Stock.
No. 202,987. Patented April 30, 1878.
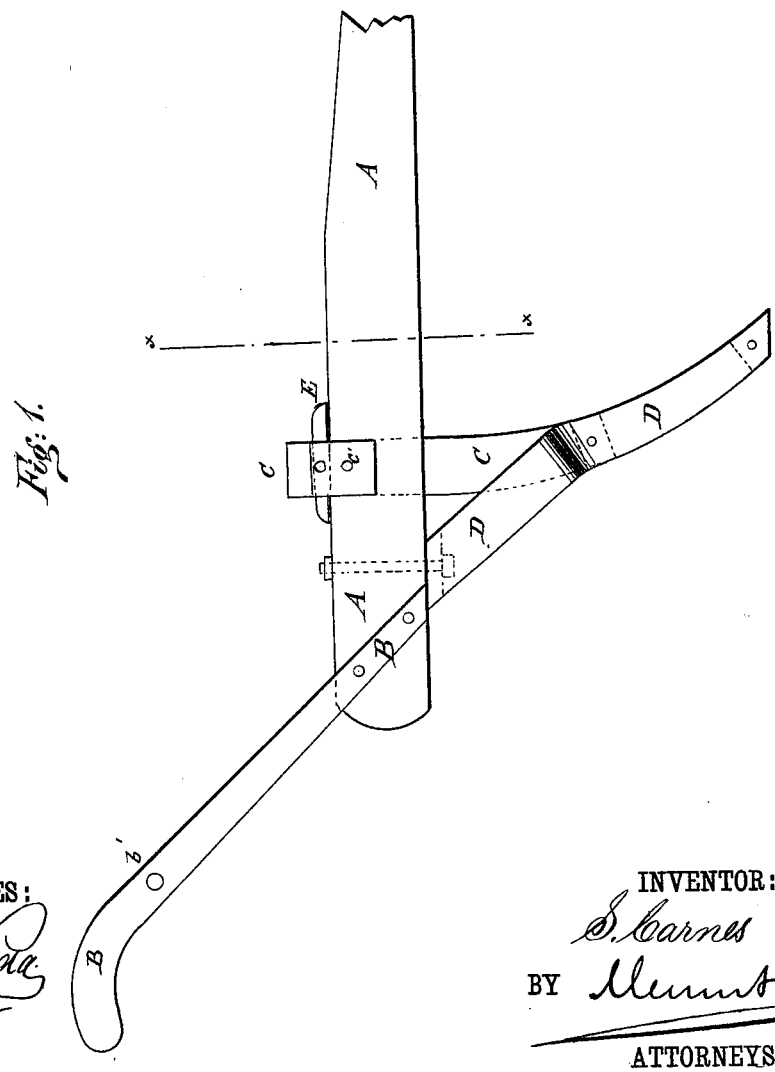

UNITED STATES PATENT OFFICE.

SAMUEL CARNES, OF JONESBOROUGH, GEORGIA.

IMPROVEMENT IN PLOW-STOCKS.

Specification forming part of Letters Patent No. 202,987, dated April 30, 1878; application filed March 2, 1878.

*To all whom it may concern:*

Be it known that I, SAMUEL CARNES, of Jonesborough, in the county of Clayton and State of Georgia, have invented a new and useful Improvement in Plow-Stocks, of which the following is a specification:

In the accompanying drawings, forming part hereof, Figure 1 is a side view of my improved plow-stock; and Fig. 2 is a front view of the same, the beam being shown in section through the line $x\,x$, Fig. 1.

Similar letters of reference indicate corresponding parts.

The object of this invention is to furnish an improved plow-stock which shall be simple in construction, inexpensive in manufacture, light, strong, and durable.

A represents the plow-beam. B represents the handles, which are attached to the rear end of the beam A, and the upper parts of which are connected by a round, $b$.

The standard is made of two bars, C D, which are secured to each other at their lower ends and middle parts by rivets or bolts. The lower parts of the bars C D are parallel with each other, and are kept at the proper distance apart to form a space to receive the bolts that secure the plow-plate in place by blocks interposed between them.

The bar C passes up across the side of the beam A, and is bent twice at right angles, so as to cross the top of the said beam A and overlap its other side. Several holes are formed in the said bar and in its overlapping end to receive the bolt $c'$, by which it is secured to the said beam, so that it may be readily adjusted higher or lower to regulate the pitch of the plow.

A wedge, E, may be inserted between the bend of the bar C and the top of the beam A when the said bar C is raised.

The upper part of the bar D is inclined to the rearward, is bent at right angles to pass beneath the beam A, and is secured to the lower side of the said beam by a bolt.

With this construction the bar C of the standard will sustain the downward pressure and the bar D will sustain the upward pressure, so that the said standard will be firmly held in place.

Having thus described my invention, I claim as new and desire to secure by Letters Patent—

The combination, in a plow, with the beam A, of the standard-bar C, passing up and bending over the said beam, and adjustable vertically thereon, and the bar D, bent rearwardly and at right angles to form a brace, as and for the purpose specified.

SAMUEL CARNES.

Witnesses:
   F. W. TIMS,
   G. E. WADDY.